Feb. 24, 1925.
A. KADOW
1,527,558
MARVERING MECHANISM FOR GLASS FORMING APPARATUS
Original Filed July 11, 1910    5 Sheets-Sheet 1
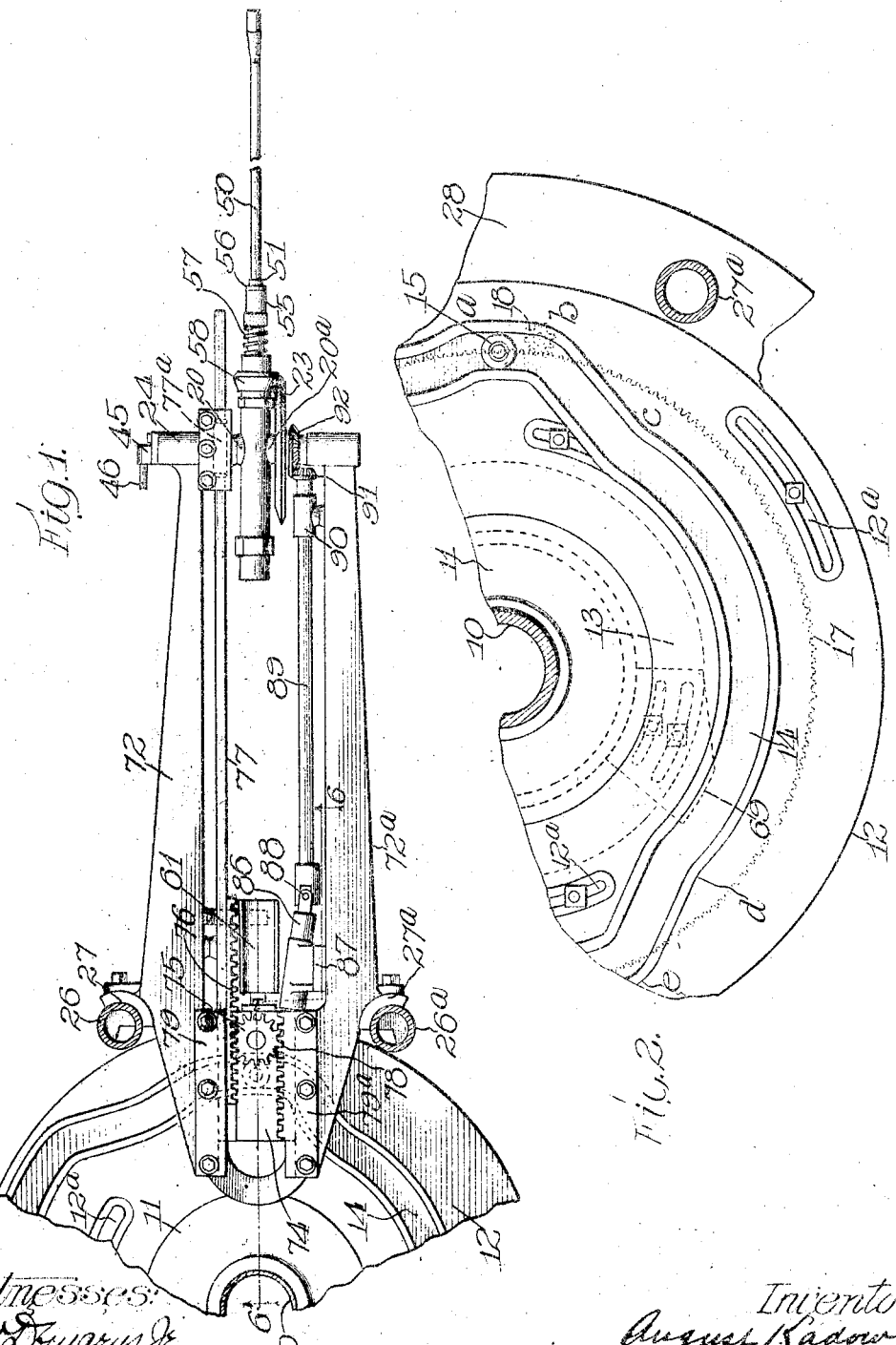

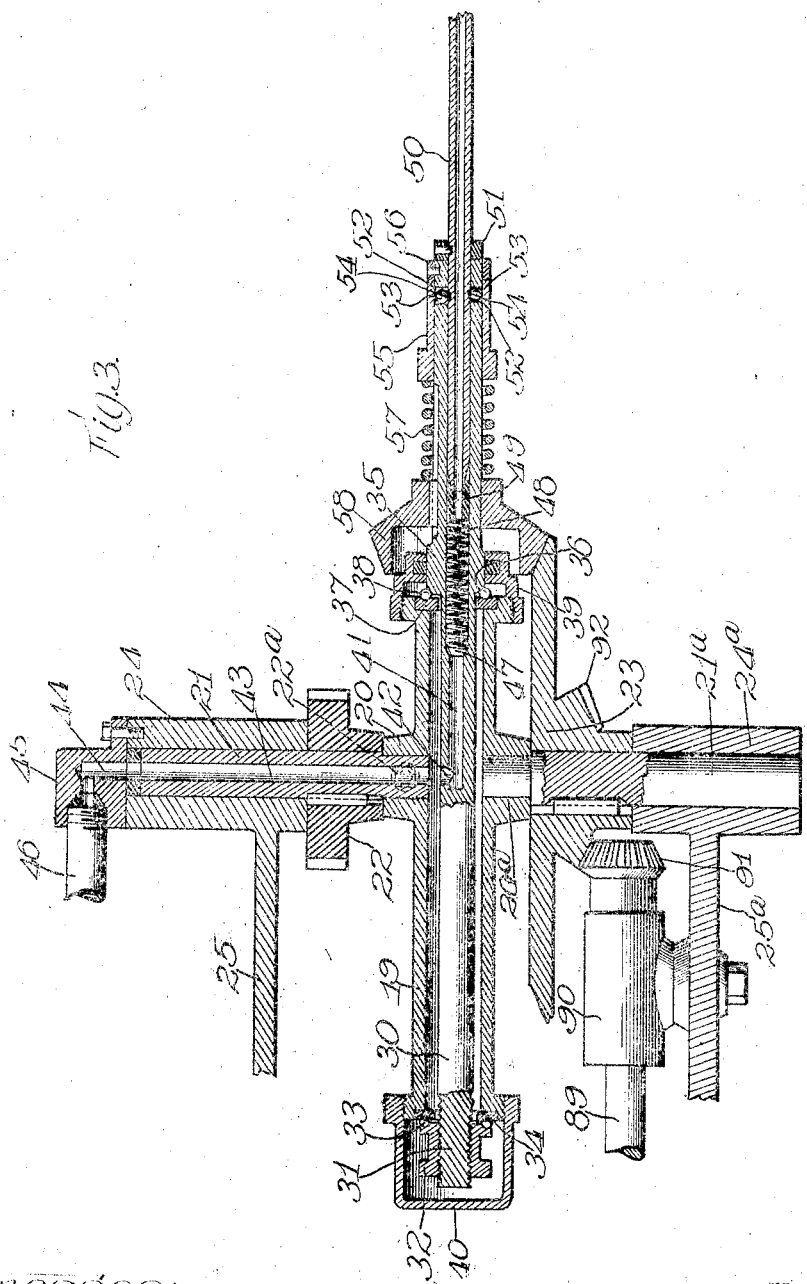

Feb. 24, 1925.  1,527,558
A. KADOW
MARVERING MECHANISM FOR GLASS FORMING APPARATUS
Original Filed July 11, 1910   5 Sheets-Sheet 3
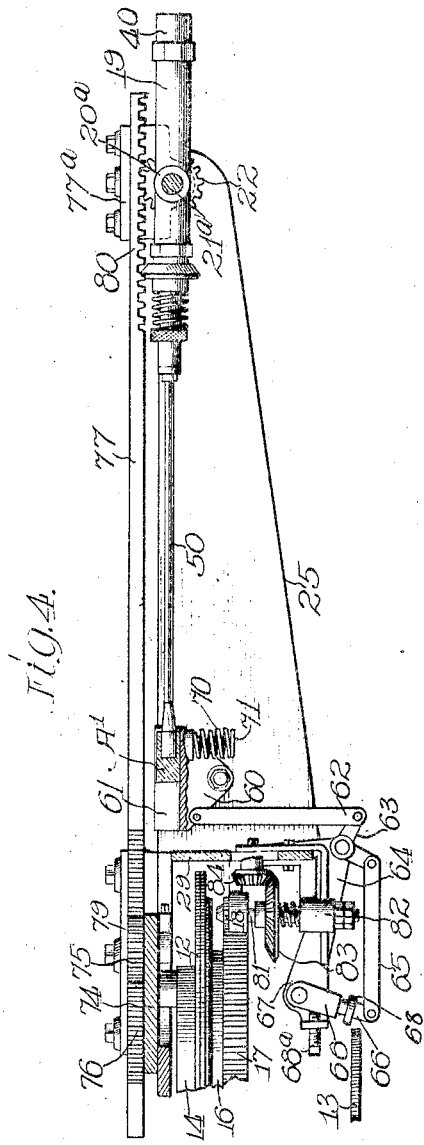
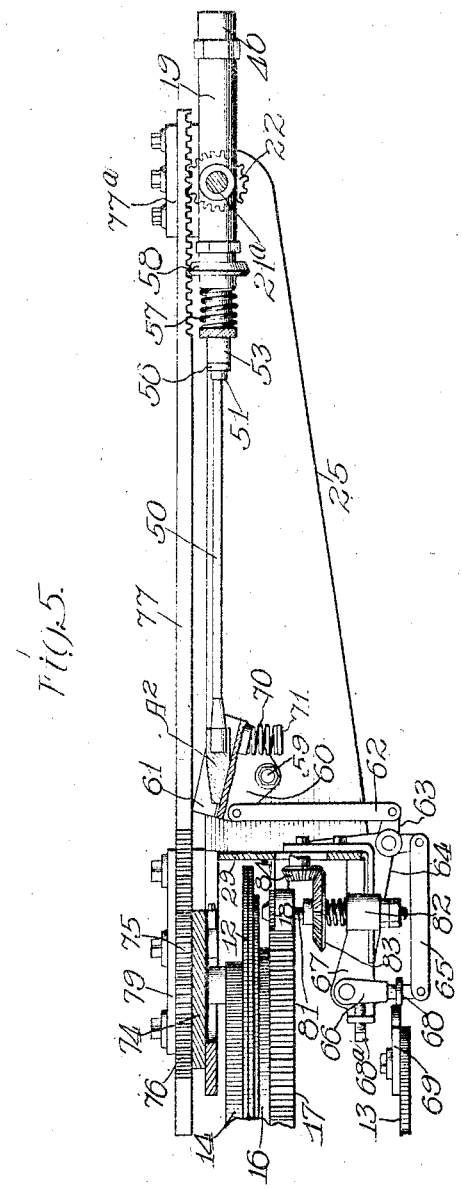
Witnesses:
Inventor:
August Kadow
by J. R. Barnett
Attorney

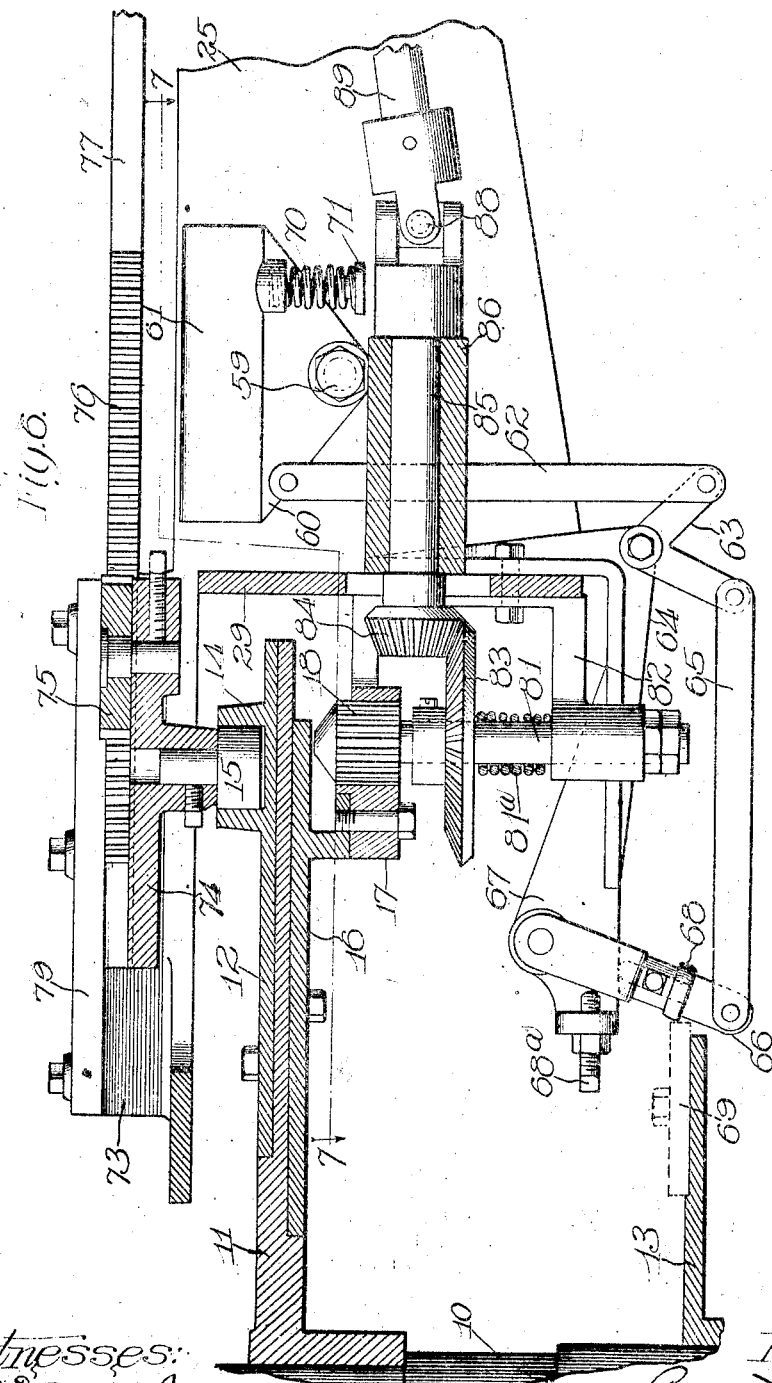

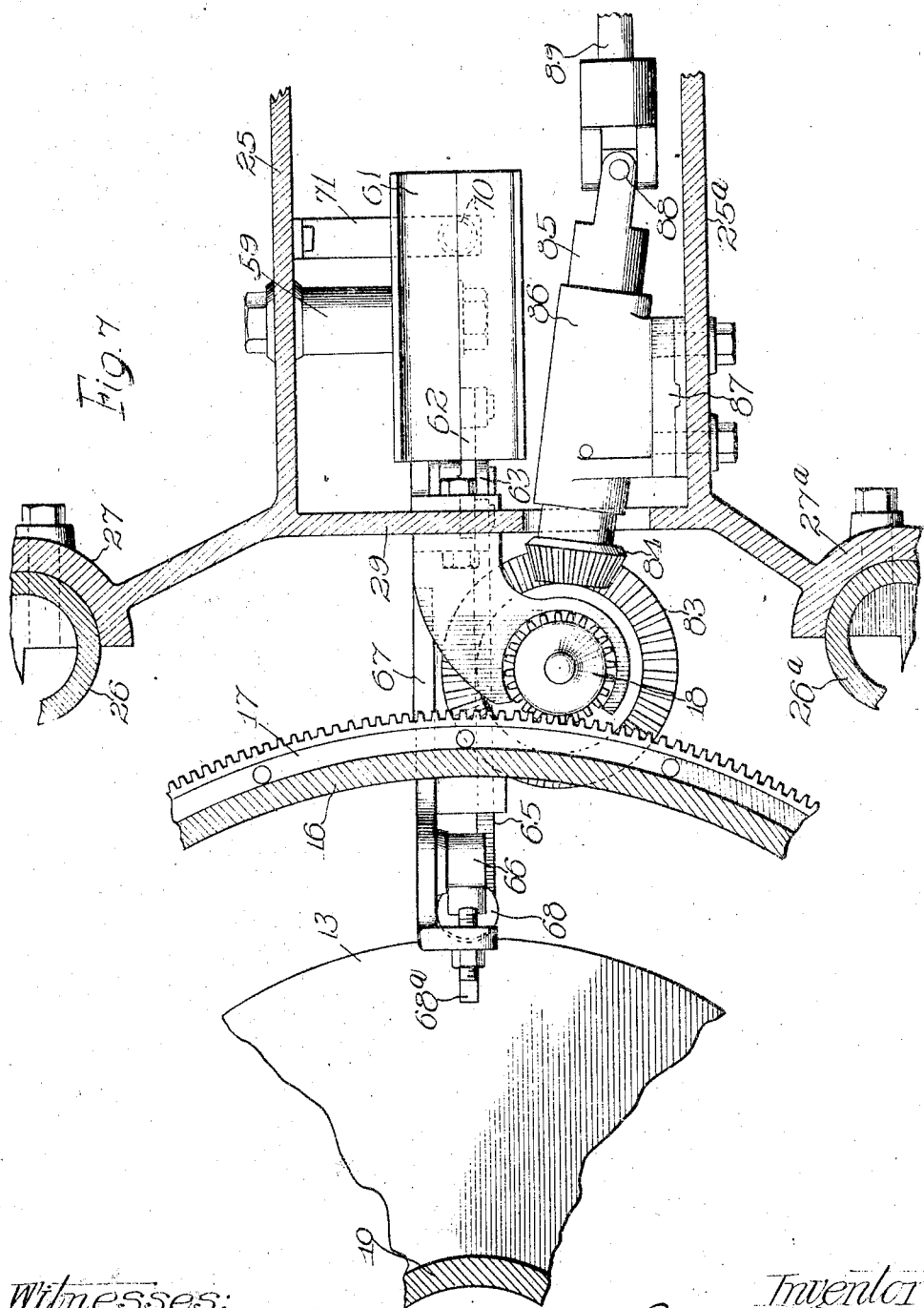

Patented Feb. 24, 1925.

1,527,558

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

MARVERING MECHANISM FOR GLASS-FORMING APPARATUS.

Original application filed July 11, 1910, Serial No. 571,442. Divided and this application filed November 25, 1910. Serial No. 594,049.

*To all whom it may concern:*

Be it known that I, AUGUST KADOW, a citizen of the United States, residing at Toledo, in the county of Lucas and State of Ohio, have invented certain new and useful Improvements in Marvering Mechanism for Glass-Forming Apparatus, of which the following is a specification.

This invention relates to automatically operated glass forming apparatus, and particularly to mechanisms adapted to perform the operation known as marvering; this application being a division of my pending application filed July 11, 1910, Serial No. 571,442.

The invention has for its object to provide certain new and improved mechanisms and combinations of mechanisms for automatically performing the operation of marvering.

The invention has for further objects, certain other new and improved constructions and devices in glass forming apparatus which will be hereinafter described and claimed.

The invention is illustrated, in a preferred embodiment, in the accompanying drawings, wherein—

Fig. 1 is a plan view of a portion of a glass forming machine illustrating the mechanisms and arrangements of mechanisms concerned in this application;

Fig. 2 is a fragmentary plan view, on an enlarged scale, of the controlling cam;

Fig. 3 is a longitudinal sectional view taken through the oscillating and rotary gathering mechanism;

Figs. 4 and 5 are vertical sectional views taken longitudinally of the gathering mechanism, and showing the marver and controlling mechanisms for the gathering device and marver, the figures showing different positions of the same parts;

Fig. 6 is a sectional view, on an enlarged scale, taken on line 6—6 of Fig. 1, looking in the direction of the arrows, and Fig. 7 is a sectional plan taken on line 7—7 of Fig. 6.

Like characters of reference indicate like parts in the several figures of the drawings.

The machine, of which only those portions are shown which are necessary for the understanding of the invention here concerned, consists of a stationary column provided with certain cams and other operating and controlling mechanisms, around which column is moved circularly the device which gathers and supports the body of glass operated upon, the operations performed upon the glass, among them the marvering operation with which this application is concerned, being effected while the glass is thus moved around the column and by means of the cams, racks, and other mechanisms above mentioned. While a single gathering device and marvering apparatus has been shown and described, it will be readily understood that a complete machine might be constructed so as to consist of a number of these sets of mechanisms, all of which could be operated simultaneously from the same stationary devices on the column.

Referring to the drawings, 10 designates the column which supports an upper ring 11 and a lower ring 13. To the upper face of ring 11 is bolted a cam plate 12, the plate being preferably slotted, as indicated at 12ª, for the purpose of adjustment. On the cam plate 12 is formed a cam way 14 adapted to receive a cam roller 15.

To the under side ring 11 is bolted an annular plate 16 to which is secured a rack 17 adapted to be meshed by a pinion 18. The gathering device, in its preferred form, is constructed as follows: A cylindrical casing 19 is provided formed with the bosses or trunnions 20, 20ª. The trunnion 20 receives the end of a shaft 21 to which is keyed the spur pinion 22. A set screw 22ª binds trunnion 20 to shaft 21. The trunnion 20ª receives the end of a shaft 21ª to which is keyed a beveled friction disc 23. Shafts 21 and 21ª are revolubly supported in bearings 24, 24ª respectively, formed on the frame members 25, 25ª, secured to the uprights 26, 26ª, by brackets 27, 27ª. The uprights 26, 26ª are mounted on a rotating platform, a portion of which is shown at 28 in Fig. 2. Rotary movement is imparted to the platform 28 by any suitable form of driving means. The frame members 25, 25ª are connected by a transverse member 29. Within casing 19 is a spindle 30, one end of which, 31, is screw threaded to receive a nut 32 which holds a set of balls 33 against their runway 34. Spindle 30 is formed further down with an enlargement 35 formed with a beveled shoulder 36, between which and a runway 37 are interposed a set of balls 38. The runway 37 is seated in a recess in the end of the casing 19 and the ball bearing thus constituted is closed by a cap piece 39. The other end of the casing is closed by a cap piece 40. The spindle 30 is formed with a bore 41 having a branch 42 opening into the space between the spindle and the inner surface of casing 19. Shaft 21 is formed with a bore 43 registering with a bore 44 in a cap piece 45 bolted to the end of bearing 24. A pipe 46 communicating with a source of supply of compressed air (not shown) is tapped into the cap piece 45. The bore in the spindle is enlarged at 47 and this enlargement contains the spiral spring 48 and a rubber gasket 49, against the latter of which bears the end of the gathering member or blow pipe 50. On the gathering member is a collar 51 and the spindle is formed with two perforations 52 which receive the balls 53 engaging with slight indentations 54 in the gathering member 50. A sleeve 55, normally pressed against a collar 56 on the end of the spindle 30 by a spiral spring 57, covers the perforation 52 in which balls 53 are located. The balls therefore clutch the gathering member 50 to spindle 30. When sleeve 55 is pushed back against the spring, balls 53 will fall out, allowing the gathering member 50 to be removed from the spindle. Spring 57 bears against a friction cone 58 feathered to the spindle and engaged by the friction disc 23.

I have shown a preferred construction of gathering mechanism, but it will be understood that the construction of the gathering mechanism pe se forms no part of my present invention, but is specifically claimed in my copending application 571,442, filed July 11, 1910, of which this present application is a division.

The apparatus for marvering the blank or body of glass collected on the end of the gathering member 50, consists, as shown, of the following mechanisms: Mounted on a pivot 59 on the frame member 25 is a plate 60, the upper portion of which is in the form of a wedge-shaped trough 61. Attached to the plate 60 is a link 62 extending to a bell crank 63 mounted on a bracket 64, secured to frame member 29, the other arm of said bell crank being connected by a link 65 to a lever 66 pivoted to a bracket 67 secured to the frame member 29 and carrying a cam follower preferably a roller 68 adapted to come into contact, at the proper point in the travel of the glass forming mechanism around the stationary column 10, with a cam 69 bolted to the lower ring 13 on the column 10. Preferably a set screw 68ᵃ is employed to give the proper initial adjustment of the lever 66. The engagement of roller 68 with cam 69 tilts the plate 60, and marver 61, against the tension of a coil spring 70, interposed between the marver and a bracket 71, carried on frame member 25.

In the operation of the machine in connection with which my present invention is illustrated, the gathering device is first dipped into a glass pot and after a body of glass has been collected on the end of the gathering device, the latter is oscillated in a vertical plane so as to bring the body of glass into contact with the marver. While the glass is in the marver it is rotated, first, with the marver in the horizontal portion shown in Fig. 4, and subsequently, with the marver tilted to the position shown in Fig. 5. The mechanisms for oscillating the gathering device and for causing the gathering member 50 to be rotated will now be described.

The frame members 25, 25ᵃ are formed with horizontal flanges 72, 72ᵃ respectively, which project inwardly beyond the transverse frame member 29, and are formed with ways 73 adapted to receive a slide 74, to the under side of which is pivoted the cam roller 15 which has been described as operating in cam way 14. On the upper side of slide 74 is pivotally mounted a pinion 75 which meshes on one side with a rack 76 formed on a rod 77, and on the other side with a rack 78 formed on a strip 79ᵃ bolted to the flange 72ᵃ, this strip, and a strip 79 on the other side, being arranged so as to overlap the slide 74. With the movement of pinion 15 in cam way 14 to or from column 10, a corresponding but multiplied movement is given to rod 77. This rod, on its outer end, extends under a guide 77ᵃ and carries a rack 80 which meshes with the spur gear 22 described as keyed to the shaft 21. The rotation of gathering member 50 is accomplished by the following mechanisms: Pinion 18 has been described as meshing with rack 17. This pinion is carried on a shaft 81 mounted in a bracket 82 on the frame member 29. Shaft 81 carries a bevel gear 83 meshing with a bevel gear 84 on a short shaft 85 mounted in a bearing 86 on a bracket 87 bolted to the frame member 25ᵃ. Shaft 85 is connected by a universal joint 88 to a rod 89 which extends through a bearing 90 on frame member 25ᵃ and carries a bevel gear 91 which meshes with a bevel gear 92 formed on the friction disc 23 which has been described as engaging with the friction pulley 58 on the spindle 30 of the gathering device. For the purpose of a certain other operation, not here concerned, which requires the disengagement of bevel gear 83 from bevel gear 84, shaft 81 is shown as slidably mounted in the bracket 82, the bevel gears 83 and 84 being normally held in engagement by a spiral spring 81ª which bears against the under side of gear 83.

The operation of the machine, so far as the particular mechanisms here shown and described are concerned, is as follows:

Supposing the gathering member 50 to have been dipped into a glass pot, either automatically or otherwise, the gathering member is oscillated so as to bring the blank of glass into contact with the marver 61, as shown in Fig. 4. During the time the blank is in the marver, and before that time, if desirable, it is rotated by means of the engagement of pinion 18 with rack 17 and the mechanisms above described which are put in operation by the movement of pinion 18 around the rack. After the blank has been thus rotated in the marver, while the latter is in its horizontal position, for a short time, the blank taking the form shown at A', Fig. 4, the marver is tilted by the engagement of the roller 68 with cam 69 on the lower ring 13. The rotation of the blank still continues and the tilting of the marver therefore gives the blank the conical form indicated at A² in Fig. 5.

The gathering device is then oscillated so as to remove the blank from the marver and bring it into position for the next operation to be performed upon it. This next operation forms no part of my present invention and therefore will not be described. Roller 68 by this time has moved past cam 69, and spring 70 returns the marver to its horizontal position.

Referring to Fig. 2, it will be seen that these operations take place while the cam roller 15 is moving from the point a on the cam track to the point e. While the cam roller is moving from a to b the gathering device is being raised (as, for example, from the glass pot) to a horizontal position. While it is moving from b to c the gathering device is being turned 180° to bring the blank into contact with the marver. From c to d there is no radial movement of the cam roller. During this period the blank remains in the marver. When the roller reaches d it begins to swing back and continues such movement until the cam roller reaches the point e.

It will be understood that while I have shown a preferred construction, arrangement and design of parts, there might be some modification thereof not involving any departure from my invention. Therefore I do not limit myself to these particulars except so far as certain of the same are made limitations on certain of the claims herein.

While the marvering devices herein shown are designed to be used in a machine of the character shown in my co-pending application Serial No. 571,442, in which all of the operations on the blank are performed automatically, it will be realized that it will be quite possible to utilize the devices, herein shown, in a machine of somewhat different character, for example, in a machine in which some of the operations are performed by hand or by movement and mechanisms different from those herein shown.

I claim:

1. In apparatus of the character described, the combination with movable supporting means, of a tilting marver thereon, a stationary cam, a lever on said supporting means, a cam follower on said lever which comes into contact with said stationary cam and a link mechanism connecting said lever with said marver, and a spring adapted to return the marver to its normal position.

2. In a machine for producing glass articles, the combination with a blow-pipe, of marverer, means for producing a marvering action between the gather and the marverer, and means for automatically causing the marverer to approach and recede from the gather during the marvering in a predetermined manner.

3. In a machine for producing glass articles, the combination with a blow pipe, of means for rotating the blow pipe, a marverer, and means for automatically causing the marverer to approach and recede from the gather during the marvering in a predetermined manner.

AUGUST KADOW.

Witnesses:
R. A. BOTHWELL,
G. L. REDRUP.